Maurice A. Bergougnou
Charles E. Jahnig

INVENTORS

BY

PATENT AGENT

United States Patent Office 3,253,053
Patented May 24, 1966

3,253,053
ALKYLATION AND ISOMERIZATION PROCESS USING HINDERED SETTLING CONTACTING
Maurice A. Bergougnou, Madison, and Charles E. Jahnig, Rumson, N.J., assignors to Esso Research and Engineering Company, a corporation of Delaware
Filed Feb. 11, 1964, Ser. No. 344,142
7 Claims. (Cl. 260—683.43)

This application is a continuation-in-part of our earlier filed application "Contacting Liquid Streams With Viscous Materials," S.N. 40,246, filed July 1, 1960.

This invention relates to a novel process for effecting contact between a viscous substance and a more fluid liquid. This invention is particularly applicable to alkylation and isomerization reactions where a viscous catalyst is to be contacted with liquid reagents.

It is known to contact separate liquid phases with each other by introducing them at vertically spaced points in a contacting column or tower, causing countercurrent flow within the tower and subsequently withdrawing the thus contacted streams from the tower. In order to improve contacting efficiency in such a process, it is common practice to provide the tower with one or more types of contacting materials, such as Raschig rings, pebbles, disc and donut plates, baffle plates and the like. Such contacting means are not completely efficient because they permit channeling, i.e. small segregated streams of one liquid tend to flow in a portion of the tower completely out of contact with a countercurrent stream of the other liquid.

It is an object of the present invention to furnish a procedure for the countercurrent contacting of a liquid with a relatively more viscous and heavier material wherein more efficient interchange between the liquid and the viscous material results. More particularly, it is the object of the present invention to furnish a procedure for the countercurrent contacting of a liquid hydrocarbon with a relatively more viscous and heavier catalyst wherein more efficient interchange between the liquid and the catalyst material results. This improved contacting will be of particular importance in alkylation reactions wherein a viscous alkylation catalyst is contacted with liquid hydrocarbon reagents and isomerization where a viscous isomerization catalyst, such as an aluminum halide catalyst, is contacted with less viscous liquid hydrocarbon reactants.

In accordance with this invention, the above objects are accomplished by distributing the viscous material as a thin layer or film on a body of small inert particles arranged as a bed. The liquid hydrocarbon that is to be contacted with the viscous catalyst material is pumped upwardly through the bed at a velocity that is slightly higher than the minimum fluidizing velocity of the bed. Under these conditions, the particles assume a regular uniform spacing within the bed. While each particle is thus imparted limited motion, i.e. it "jiggles" in place, there is very little mass movement of particles through the bed.

More specifically, with reference to alkylation, the invention may be described as a method for conducting a liquid phase alkylation reaction involving liquid paraffinic and olefinic hydrocarbons and a viscous alkylation catalyst. This viscous alkylation catalyst may be any of a great variety of viscous alkylation catalysts such as HF, $H_2SO_4$, a viscous complex of an aluminum halide catalyst, fluorosulfonic acid or any other known viscous alkylation catalyst. The alkylation catalyst is spread in the form of a thin layer on a plurality of substantially small inert particles by flowing the said alkylation catalyst downwardly over the small inert particles. A stream of liquid paraffinic and olefinic hydrocarbons is then directed upwardly through the bed of coated particles. The velocity of the stream of paraffinic and olefinic hydrocarbons is sufficient to produce a condition of hindered settling of the coated particles but is not sufficient to entrain the viscous catalyst liquid which is downflowing through the bed. With respect to isomerization, the invention may be described similarly. The isomerization catalyst, which is in this case a viscous aluminum halide catalyst, is spread in the form of a thin layer on a plurality of substantially small inert particles by flowing the said viscous aluminum halide catalyst downwardly over the small inert particles. A stream of $C_4$-$C_7$ liquid paraffinic hydrocarbons is then flowed upwardly through the bed of coated particles at a velocity which is sufficient to produce a condition of hindered settling of said coated particles but not sufficient to entrain the said viscous aluminum halide catalyst liquid which is downflowing through the bed of inert particles.

Several obvious variations of this process should be considered. One in particular which is worthy of note would be to precoat the particles with the viscous catalyst and after that pass the less viscous liquid up through the particle bed.

It is well-known to catalyze the isomerization of paraffinic hydrocarbons with aluminum halide complexes. Such complexes can be prepared from an aluminum halide such as $AlBr_3$ and liquid paraffinic or olefinic hydrocarbons. Other complexes can be made from aluminum halides and ethers and alkyl halides. Because many of these complexes are quite viscous, a problem arises in bringing about good contact between the complex and the reacting hydrocarbons. Such contacting can be done in staged reactors equipped with high powered stirrers but usually the costs in such a system are prohibitive. The complex can also be dispersed on a fixed bed of a particulate support and the hydrocarbons to be contacted can be flowed through the bed. However, the complex will tend to flow through the bed as distinct streams or rivulets and thus cause bypassing. Thus, previous methods for contacting liquids with viscous materials have either been inefficient or even too expensive. The present invention provides a low cost, efficient method for effecting the desired contacting for alkylation and isomerization reactions. The nature of the invention and the manner in which it is to be practiced will be understood from the ensuing description when reference is made to the accompanying drawings.

Figure 1:
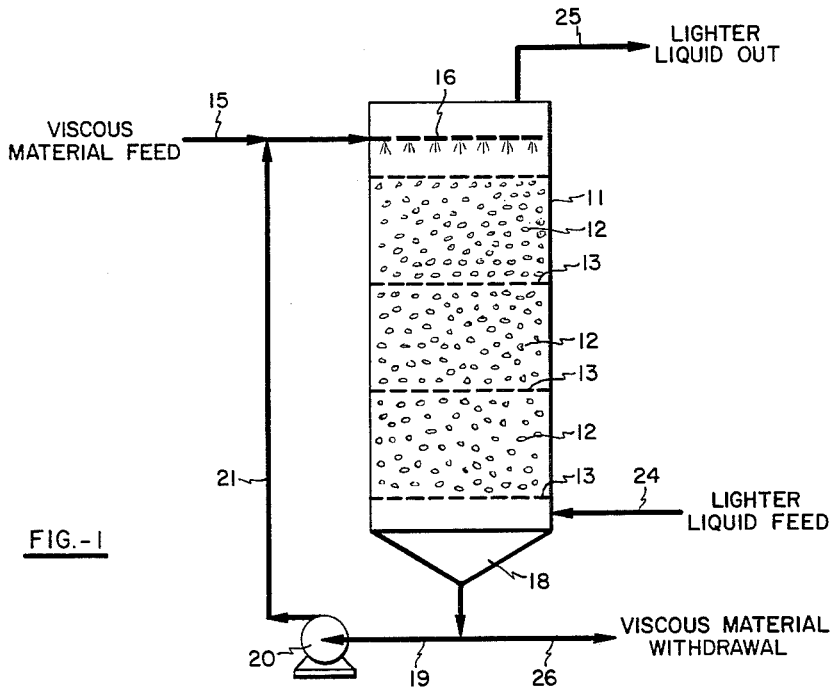
FIGURE 1 is a flow diagram illustrating a contacting procedure that can be used when the viscous material has sufficient fluidity to flow through the bed of particulate material.

Referring now to FIGURE 1, a suitable contacting tower 11 contains 1 or more beds 12 of particles of an inert material. If it is found that bulk convection movements tend to occur in the tower, these may be avoided by inserting horizontal loose wire screens 13.

The viscous material that is used in the process enters the tower through line 15 and flows downwardly in the tower until it reaches the beds of particulate material. While it is possible for many viscous materials to break into droplets upon contact with the upflowing lighter liquid it is preferred to employ means for distributing or "sprinkling" the viscous material across the beds of particulate material. Such means may comprise a plurality of nozzles 16, for example.

As the viscous material reaches the beds, it then coats the particles with a thin film. If it is sufficiently fluid it will eventually drip down from particle to particle in the bed and can be collected in a trough 18 at the bottom of the tower. The viscous material can then be removed by line 19 and pumped again by means of pump 20 through line 21 to the top of the bed.

The less viscous liquid that is to be contacted with the viscous material enters the tower through line 24 and flows upwardly through the bed of material. Sufficient velocity is imparted to the entering stream of light liquid to provide hindered settling conditions, i.e. with sufficient velocity so that the particles tend to be separated from each other but yet do not circulate freely from their original location. The upwardly moving liquid leaves the tower through line 25.

A system such as has been described in conjunction with FIGURE 1 can be used in solvent extraction processes such as, for example, the $SO_2$ extraction of aromatic hydrocarbons from heavy lubricating oil fractions. The bed or beds of contact particles are slightly fluidized under hindered settling conditions by an upflowing stream of liquid sulfur dioxide while the stream of heavy oil drips downwardly from particle to particle within the bed, countercurrent to the upflowing stream of sulfur dioxide. Since the particles are in a quasi-fluidized state in which they touch each other only momentarily, the oil film is repeatedly broken as the oil moves from particle to particle. As a result, mass transfer is considerably greater than in a fixed bed of particles.

Figure 2:
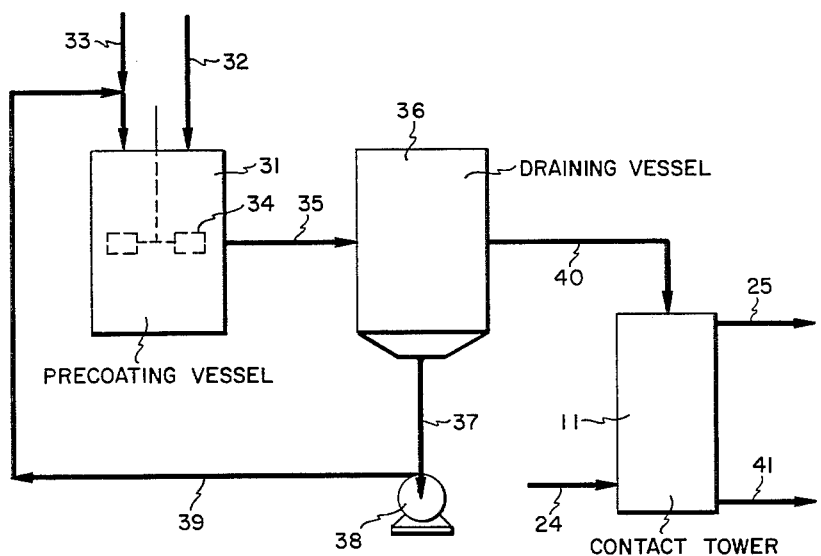
FIGURE 2 is a flow diagram showing a procedure that can be used when it is more convenient to coat the particles with the viscous material before placing them in a bed.

In FIGURE 2 is shown an arrangement that is useful where the viscous material does not readily flow. In this arrangement the particles of inert material are precoated with the viscous material before they enter the contacting tower. Thus, a precoating vessel 31 is supplied into which the inert particles are introduced by means of line 32. The viscous material enters the vessel through line 33 and contacting is effected by means of a stirrer or equivalent means 34. After the particles of viscous material have been thoroughly mixed, they are conducted by means of line 35 into a draining vessel 36 which may be heated to a sufficiently high temperature so that the viscous material will be sufficiently fluid to permit the excess to drain from the particles. The drained material is then removed through line 37 and forced by means of pump 38 through line 39 back to the precoating vessel. The coated particles are conducted by means of line 40 into tower 11 and the contacting is brought about in the same manner as described with reference to FIGURE 1. Particles that have contacted the liquid being treated are removed through line 41 for reuse in the process if desired.

Thus, from the above, it is apparent that in the case of an extremely viscous alkylation catalyst, one would be able to precoat the particles with this catalyst and then pass a mixture of liquid olefinic and paraffinic hydrocarbons up through tower 11 after being introduced by means of line 24.

The particles of inert material useful in this invention may range in size from as small as 200 mesh up to an inch or more in diameter. In many cases the size and type of particles used will depend on the particular application of the process. The density of the particles will be chosen so that the flow of the light liquid will be sufficient to "semifluidize" them, i.e. to produce a condition of hindered settling, but not sufficient to entrain the heavy downflowing liquid.

The inert particles may comprise glass beads, for example, although it is preferred especially for catalytic reactions that particles be employed that are irregular in shape because such particles would tend to adsorb more viscous material than would smooth particles. Sintered Carborundum particles constitute one type of irregular particle that is suitable since they have rough outside macroporous surfaces and have essentialy no internal porosity.

For the extraction of lubricating oil fractions with liquid $SO_2$, one type of particle that may be used comprises spheres of hydrocarbon-resistant material such as polyethylene or tetrafluoroethylene, for example, which may or may not be hollow, in the diameter range of say ⅓ to 1 inch or more.

This invention is particularly applicable to isomerization reactions wherein a paraffin hydrocarbon of from about 4 to 7 carbon atoms is contacted with an aluminum halide catalyst which in this instance would be a relatively viscous complex of aluminum chloride or aluminum bromide. The process is similarly applicable to the related reaction known as paraffin alkylation wherein a major proportion of a butane and/or a pentane is reacted directly with a minor proportion of a higher paraffin hydrocarbon of from 6 to 18 carbon atoms in the presence of a viscous alkylation catalyst such as an aluminum halide, sulfuric acid, hydrofluoric acid, fluorosulfonic acid or any of the great variety of viscous alkylation catalysts to form primarily $C_5$ to $C_7$ branched chain saturated paraffin hydrocarbons of high octane rating.

The invention is also applicable to the treating of an effluent stream from either an isomerization reaction or a paraffin alkylation reaction wherein the product effluent contains dissolved aluminum bromide which must be removed from the effluent. In this case the viscous material comprising an aluminum bromide complex serves to extract the aluminum bromide from solution in the hydrocarbon stream.

Viscous complexes of aluminum halides with paraffinic and/or olefinic hydrocarbons, alkylate bottoms, kerosene fractions, and the like are well-known and hence their preparation need not be described in detail here.

Figure 3:
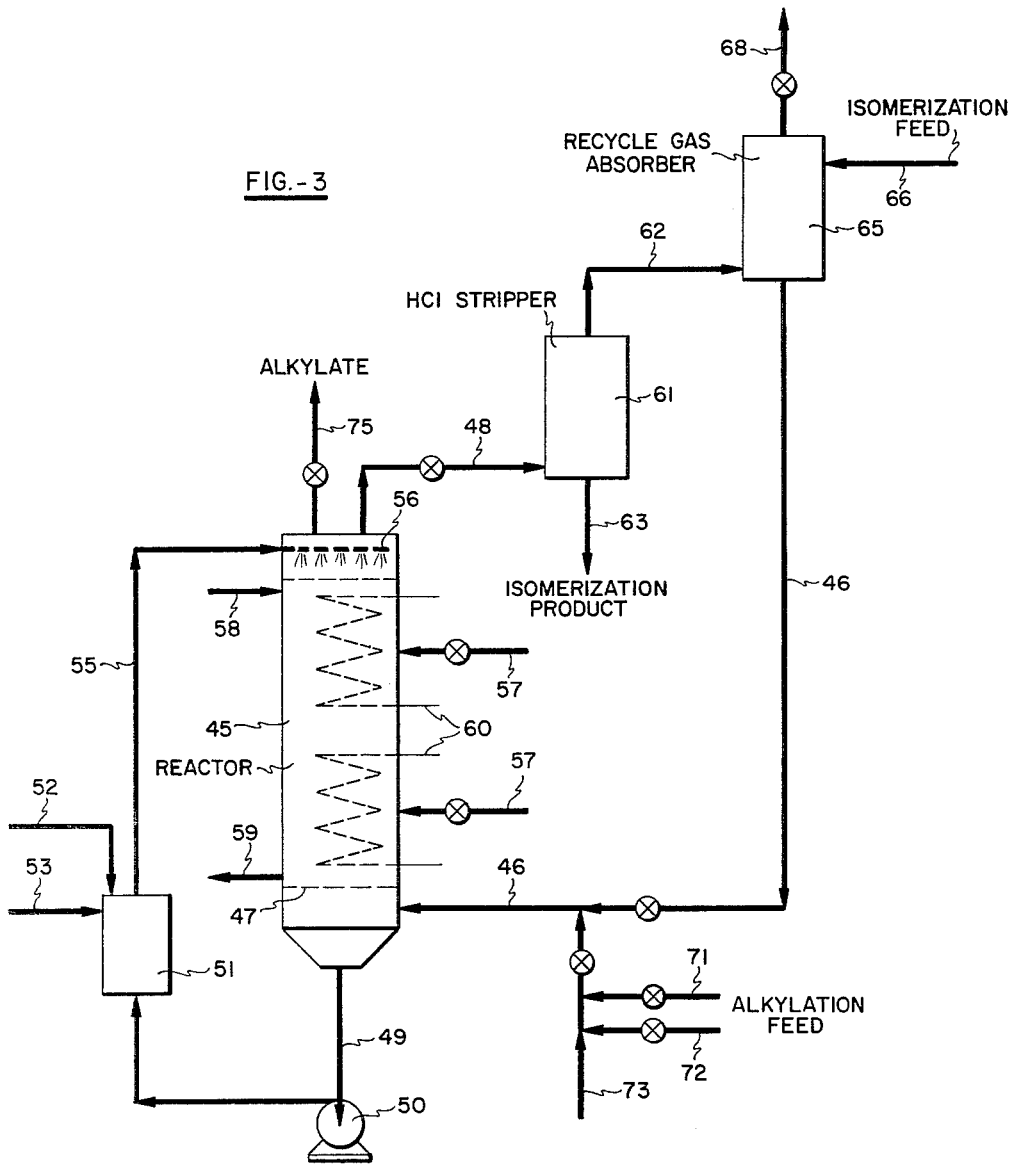
FIGURE 3 is a flow diagram showing application of the invention to an isomerization process for paraffin hydrocarbons.

Use of the invention in the isomerization of paraffin hydrocarbons is illustrated by the flow diagram of FIGURE 3. A suitable particulate support is first coated with a complex of aluminum chloride and a hydrocarbon. This can be done in the manner shown in conjunction with FIGURE 2, after which the coated particles are charged to reactor 45. The feed to be isomerized which may comprise liquid pentane or liquid hexane, or a light naphtha, for example, is introduced at the bottom of the vessel through line 46 and enters the bed of particles through the supporting grid 47. The velocity of flow is such that the particles are semifluidized. It is preferred to conduct the isomerization in the presence of hydrogen chloride as a promoter. This is most conveniently introduced by first subjecting the feed to saturation with hydrogen chloride in a recycle gas absorber 65. The feed enters the absorber through line 66 and contacts a recycle stream of hydrogen chloride entering through line 62. If light gases tend to build up in the system, these may be bled off through line 68.

Preferably the feed stream is first treated to remove materials that might poison the catalyst. This is done by means not shown, and the treatment may involve such steps as olefin extraction, extractive distillation, hydrogenation or treatment with selective adsorbents. The treatment may also include contacting with deactivated sludge type catalyst in a contacting zone such as shown in FIGURE 1.

The hydrocarbon stream undergoing isomerization passes upwardly through a semifluidized bed of particles in reactor 45 and contacts a downflowing stream of viscous catalyst complex introduced by means of line 55 and distributor 56. The isomerization products leave the reaction zone through line 48 and are conducted to a hydrogen halide stripping zone 61. The hydrogen halide is removed overhead through line 62 while the stripped products are removed through line 63.

As the viscous catalyst moves downwardly through the semifluidized bed it collects in the bottom of the reaction zone and is then recycled to the top of the bed by means of line 49 and pump 50. If necessary, the catalyst can be fortified or reactivated in zone 51 where additional aluminum chloride can be added if necessary by means of line 52. Line 53 may be employed for adding additional hydrocarbon for the complex if such is needed.

In some instances, the particles may in time tend to become coated with gummy inactive catalyst. If this occurs, a portion of the catalyst bed may be bled off through line 59 and fresh particulate support added through line 58. This feature constitutes an advantage over a fixed bed type of operation where replenishment of catalyst support cannot be accomplished without completely shutting down the unit to provide for a total catalyst changeover. An additional advantage of the system of the present invention is that better fluid flow distribution results as compared with a fixed bed where there is a tendency for buildup of dead pockets of liquid with a resulting decrease in the effective space velocity as well as an adverse effect on catalyst life.

Temperature control can be provided in reaction zone 45 by the use of heat exchange coils 60. Alternatively, cooled or heated liquid can be injected at selected points in the bed, as by means of lines 57, for example, to control temperature. Temperature control by those means is much more effective in the present invention than in fixed bed operations.

Suitable reaction conditions for the isomerization include temperatures in the range of from about 100° to 200° F. and sufficient pressure to maintain liquid phase operation, e.g. about 200 p.s.i. Feed rates of from about 0.2 to about 1.0 v./hr./v. are desirable. About 1 weight percent of HCl based on feed may be used as a promoter. In some cases about 0.2 volume percent of benzene may be included in the feed as an additional promoter for the sludge type catalyst. Complexes comprising aluminum bromide rather than aluminum chloride may also be used, in which case lower reaction temperatures of the order of about 100° to 150° F. are more desirable.

Using a somewhat similar procedure as described for isomerization, the present invention may also be employed for reactions involving the alkylation of olefins and isoparaffins, as for example the alkylation of ethylene and propylene with isobutane. Thus, a stream of demethanized ethylene from a catalytic cracking operation obtained by means of line 71 may be added along with a propylene stream from a steam cracking operation obtained by means of line 72 and both may be mixed with an isobutane stream in line 73 and sent into reaction zone 45 by means of line 46.

The reaction stream may then be contacted with a great variety of different viscous alkylation catalysts. Suitable catalysts would include HF, $H_2SO_4$, fluorosulfonic acid and an aluminum halide catalyst such as aluminum chloride hydrocarbon complex in the same manner as previously described for the isomerization reaction. For alkylation, the reaction conditions may vary widely. Temperatures of 0° to 120° F. and pressures of 10 p.s.i.g. to 500 p.s.i.g. would be acceptable depending upon the feedstock to be utilized. A lighter feedstock such as a $C_2$ would require a considerably higher pressure than a $C_4$ feedstock and appropriate conditions of temperature and pressure would be readily obvious to one skilled in the art. The alkylate consisting largely of diisopropyl or 2,3-dimethyl butane is removed from the reactor by means of line 75 and then subjected to further treatment by means not shown. Such treatment includes filtration, caustic treating, further filtration and drying, depropanizing, deisobutanizing and rerunning. Reaction conditions and material balances for alkylation with an aluminum halide such as aluminum chloride are given below.

$C_2\!=\!/C_3\!=$ mole ratio _____ 2.0–2.4.
$iC_4$/olefin mole ratio _____ 4.5.
Temperature, ° F. _____ 115–120° F.
Pressure _____ Bubble point.
Hydrocarbons/catalyst volume ratio in reactor _____ 2.0.
Percent $C_2\!=$ reacted _____ 90.
Percent $C_3\!=$ reacted _____ 100.
Heat of reaction:
    B.t.u./lb. of $C_2\!=$ reacted ___ 1370.3.
    B.t.u./lb. of $C_3\!=$ reacted ___ 865.5.
Total alkylate ($C_5$+) yields ____ Lb./lb. of olefin.
    With $C_2\!=$ _____ 2.8.
    With $C_3\!=$ _____ 2.23.
Isobutane consumed _____ Lb. $iC_4$/lb. of olefin.
    With $C_2\!=$ _____ 1.8.
    With $C_3\!=$ _____ 1.23.

Reaction conditions and material balances for alkylation with HF or $H_2SO_4$ are given below.

$C_3\!=\!/C_4\!=$ mole ratio _____ 2.0–2.4.
$iC_4$/olefin mole ratio _____ 4.5.
Temperature, ° F. _____ 45–50° F.
Pressure, p.s.i.g. _____ 25–30.
Hydrocarbons/catalyst volume ratio in reactor _____ 2.0.
Percent $C_3\!=$ reacted _____ 100.
Percent $C_4\!=$ reacted _____ 100.
Heat of reaction:
    B.t.u./lb. of $C_3\!=$ reacted ____ 865.5.
    B.t.u./lb. of $C_4\!=$ reacted ____ 600.
Total alkylate ($C_5$+) yields _____ Lb./lb. of olefin.
    With $C_3\!=$ _____ 2.8.
    With $C_4\!=$ _____ 2.23.
Isobutane consumed _____ Lb. $iC_4$/lb. of olefin.
    With $C_3\!=$ _____ 1.8.
    With $C_4\!=$ _____ 1.23.

With respect to isomerization of a normal $C_5$ hydrocarbon, conditions and yields would be as follows:

HCl in feed percent by weight __ 1 to 2.
Temperature, ° F. _____ 150° F.
Pressure _____ Sufficient to maintain liquid phase.
Rate of introduction of feed v./v./hr. _____ 15.
Product:
    $i\text{-}C_4$ _____ Trace.
    $n\text{-}C_5$ _____ 24.9%.
    $i\text{-}C_5$ _____ 74.9%.
    $n\text{-}C_6$ _____ Trace.

With respect to isomerization of a normal $C_7$ hydrocarbon, conditions and yields would be as follows:

HCl in feed percent by weight _ 1 to 2.
Temperature, ° F. _____ 150° F.
Pressure _____ Sufficient to maintain liquid phase.
Rate of introduction of feed v./v./hr. _____ 15.
Isobutane consumed _____ Lb. $i\text{-}C_4$/lb. of feed=1.
Product:
    $C_3$ _____ Trace.
    $i\text{-}C_4$ _____ 7.6.
    $n\text{-}C_4$ _____ 1.0.
    $i\text{-}C_5$ _____ 15.2.
    $n\text{-}C_5$ _____ 2.7.
    2,2-dimethyl butane _____ 6.6.
    2,3-dimethyl butane and 2-methyl pentane _____ 11.0.
    3-methyl pentane _____ 3.1.
    $n\text{-}C_6$ _____ 2.1.
    2,2-dimethyl pentane+2,4-dimethyl pentane _____ 3.8.
    2,2,3-trimethyl butane ___ 1.4.
    3,3-dimethyl pentane+2-methyl hexane _____ 5.9.
    2,3-dimethyl pentane+3-methyl hexane _____ 4.1.
    $n\text{-}C_7$ _____ 28.9.
    $C_8$ and higher _____ 6.5.

The process of this invention may also be applied to other alkylation reactions, such as the alkylation of aromatic hydrocarbons such as benzene with olefins such as tetrapropylene and the like for the manufacture of detergents, for example.

The scope of this invention is to be determined by the claims appended hereto and is not to be limited to the specific examples presented herein.

What is claimed is:

1. A method for conducting a liquid phase alkylation reaction in which a mixed stream of liquid paraffinic and olefinic hydrocarbons is contacted with another stream, said other stream comprising a viscous, immiscible alkylation catalyst which comprises flowing said viscous catalyst downwardly onto a plurality of substantially inert particles wherein said viscous catalyst forms a thin layer on said small inert particles, flowing a stream of said liquid paraffinic and olefinic hydrocarbons upwardly through said inert bed of coated particles at a velocity sufficient to produce a condition of hindered settling of said coated inert particles but not sufficient to entrain said viscous catalyst liquid downflowing through said bed, removing said viscous catalyst from one end of said bed, removing alkylated hydrocarbon from the other end of said bed.

2. The process of claim 1 wherein said alkylation catalyst is a viscous complex of aluminum chloride.

3. The process of claim 1 wherein said alkylation catalyst is HF.

4. The process of claim 1 wherein said alkylation catalyst is fluorosulfonic acid.

5. The process of claim 1 wherein said alkylation catalyst is sulfuric acid.

6. A method for conducting an isomerization reaction wherein a liquid $C_4$ through $C_7$ paraffinic hydrocarbon is contacted with an immiscible viscous complex of an aluminum halide catalyst which comprises flowing said viscous catalyst downwardly over a bed of substantially small inert particles wherein said viscous catalyst forms a thin layer on said inert particles, flowing a stream of said $C_4$ through $C_7$ liquid paraffinic hydrocarbons upwardly through said bed of coated particles at a velocity sufficient to produce a condition of hindered settling of said coated inert particles but not sufficient to entrain the said viscous aluminum halide catalyst liquid downflowing through said bed, withdrawing said isomerized paraffinic hydrocarbon from the upper end of said bed and withdrawing said viscous catalyst from the lower end of said bed.

7. The process of claim 6 wherein said viscous catalyst is aluminum chloride.

References Cited by the Examiner

UNITED STATES PATENTS

| | | | |
|---|---|---|---|
| 2,346,294 | 4/1944 | Danforth | 260—683.48 |
| 2,408,186 | 9/1946 | Atwell et al. | 260—683.68 |
| 2,418,146 | 4/1947 | Upham | 260—683.68 |
| 2,747,003 | 5/1956 | Kilpatrick | 260—683.48 |
| 2,987,465 | 6/1961 | Johanson | 208—10 |

DELBERT E. GANTZ, *Primary Examiner.*

R. H. SHUBERT, *Assistant Examiner.*